May 22, 1923.　　　　H. A. FAES　　　　1,455,782
FLYTRAP
Filed March 7, 1922　　　2 Sheets-Sheet 1

Inventor
H. A. Faes
By Philip A. H. Ferrell
Attorney

May 22, 1923. 1,455,782
H. A. FAES
FLYTRAP
Filed March 7, 1922 2 Sheets-Sheet 2

Inventor
H. A. Faes
By Philip A. L. Serell
Attorney

Patented May 22, 1923.

1,455,782

UNITED STATES PATENT OFFICE.

HENRY A. FAES, OF CROOK, COLORADO.

FLYTRAP.

Application filed March 7, 1922. Serial No. 541,683.

*To all whom it may concern:*

Be it known that HENRY A. FAES, citizen of the United States, residing at Crook, in the county of Logan and State of Colorado, has invented certain new and useful Improvements in Flytraps, of which the following is a specification, reference being had therein to the accompanying drawings.

The invention relates to fly traps, and has for its object to provide a combination window and stand fly trap, which trap is rectangular in shape, and has its front and rear walls formed from mesh material and provided with a fly entrance pyramidal shaped, the front wall of which is formed from translucent material, such for instance as celluloid, the lower edge of which is adapted to engage a window pane frictionally and cause the flies as they crawl up the pane to be guided into the fly entrance and into the trap.

A further object is to provide a detachable bait pan beneath the fly entrance for the reception of bait, said pan being suspended from a hook in such a manner that the pan when slightly tilted will allow bait to be poured into the pan.

A further object is to provide the downwardly and outwardly extending walls of the pyramidal entrance with extensions to which downwardly and outwardly extending guide members are hingedly connected and limited in their downward movement, said guide members have slidably carried extensions forming means for guiding flies as they crawl up a window pane or a screen door, into the entrance. Also to provide means whereby the guide members may be held in vertical position when the trap is supported on a horizontal support, such for instance as a window ledge.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
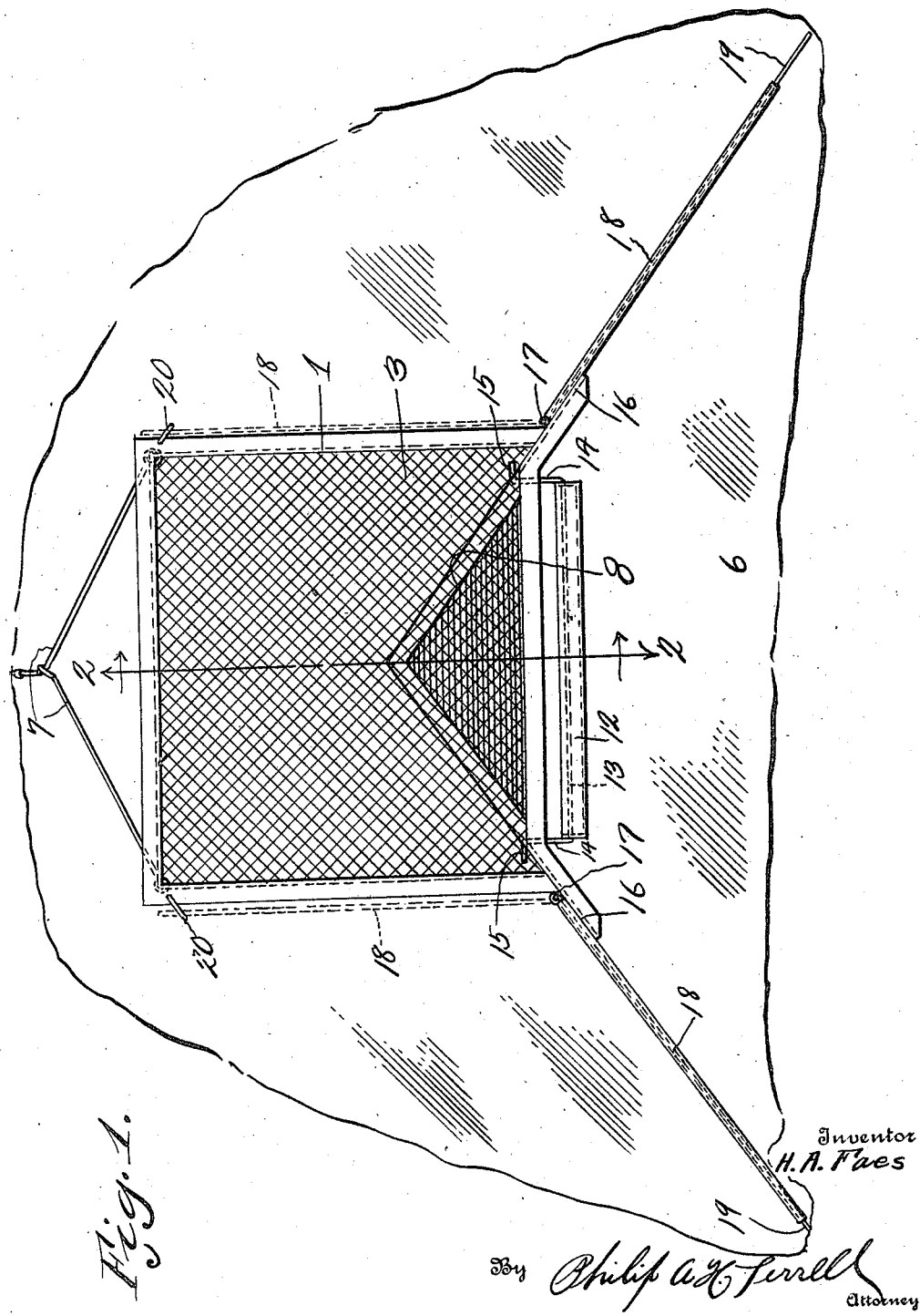
Figure 1 is a front elevation of the trap showing the same supported against a window frame and with the guide members extended.

Referring to the drawings, the numeral 1 designates a rectangular shaped receptacle, the front wall 2 and the rear wall 3 of which are formed from wire mesh, the side and top walls being preferably formed from a single sheet of material. The top wall 4 is provided with a slidable closure 5, which is removed when the contents of the trap are being removed. The trap is suspended adjacent a window pane 6 by the supports 7, which may have connected thereto any means desired for attaching to the window frame.

Extending upwardly into the bottom of the receptacle 1 is a pyramidal shaped insect entrance 8, the front wall 9 of which is formed from transluscent material such for instance as celluloid, thereby allowing light to pass through into the entrance 8 in such a manner as to attract the insects as they move upwardly, and at the same time to provide substantially a surface smooth like the glass 6 over which the insects crawl all the way to the opening 10, through which they pass into the receptacle 1. The lower end of the celluloid member 9, forming the front wall of the entrance, extends slightly forwardly of the front side 2 of the receptacle 1 and closely engages the inner side of the window pane 6, thereby preventing the insects from passing upwardly between the front wall 2 and the pane 6. All the walls of the entrance 8, with the exception of the front wall 9 are formed from wire mesh.

Figures 2, 3:
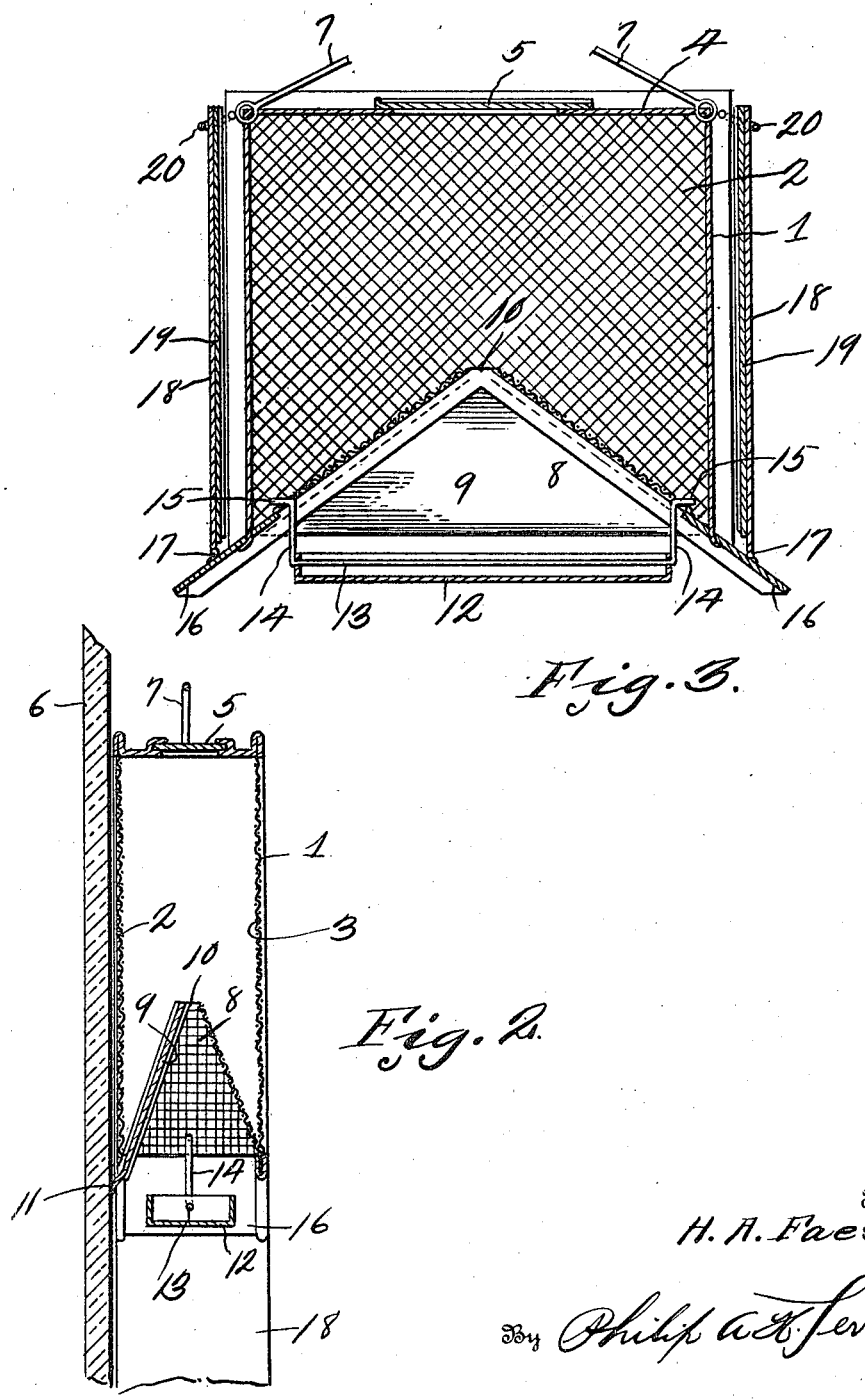
Figure 2 is a vertical transverse sectional view through the trap taken on line 2—2 of Figure 1.
Figure 3 is a vertical longitudinal sectional view through the trap, showing the guide members held out of operative position.

Disposed slightly below the insect entrance 8 is an elongated bait pan 12, which bait pan is carried by a U-shaped member 13 having upwardly extending arms 14, the upper ends of which terminate in right angularly extending arms 15, which extend through the wire mesh of the sides of the insect entrance 8 as shown in Figure 3, thereby supporting the bait pan in such a manner that it may be easily filled by simply pulling the lower end of the trap outwardly, which will allow the pan 12 to be easily reached and refilled.

Extending downwardly and outwardly at substantially the same angle as the side walls of the entrance 8 are ledges 16, to the upper faces of which are pivotally connected at 17, fly guiding members 18, which members are limited in their downward movement by engagement with the ledges 16, and are provided with slidable extension members 19, which may be extended for increasing the field of operation of the device. When the guide members 18 and the extensions 19 are in extended positions as shown in Figure 1, insects especially flies, when they crawl up the window pane 6 will be guided into the fly entrance 8, and thence into the trap.

When the device is resting on a window sill or other support, and is not used adjacent a window pane, the guide members 18 are moved to vertical positions after the extensions 19 have been moved inwardly and are held in vertical position by the pivoted yokes 20 carried by the receptacle, which yokes are passed over the free ends of the guide members 18. The support for the device, when the guide members 18 are folded as shown in Figure 3, is the lower end of each of the ledges 16, which ledges are positioned slightly below the lower side of the bait pan, therefore it will be seen that the bait pan will not rest on the window sill or other support, and consequently the bait pan may be easily filled at all times.

From the above it will be seen that a fly trap is provided, which is simple in construction, parts reduced to a minimum, and the trap so constructed that flies will be guided therein.

The invention having been set forth what is claimed as new and useful is:

1. The combination with an insect trap adapted to be disposed adjacent a window pane, an insect entrance in the bottom of said trap, of pivotally connected downwardly and outwardly extending guide members carried by the trap at each side of the insect entrance and means for holding said guide members in substantially vertical positions adjacent the sides of the trap.

2. The combination with an insect trap adapted to be disposed adjacent a window pane, an insect entrance in the bottom of said trap, of pivotally connected downwardly and outwardly extending guide members carried by the trap at each side of the insect entrance, means for limiting the downward movement of the pivoted guide member, extensible members carried by the guide members, and means for holding the guide members in inoperative position adjacent the sides of the trap.

3. An insect trap comprising a receptacle adapted to be supported adjacent a window, downwardly and outwardly extending legs carried by said receptacle and forming means for supporting the trap on a horizontal support, insect guide members pivoted to said legs at points spaced from their ends, said legs forming means for limiting the downward movement of the guide members, means for holding the guide members in vertical positions adjacent the sides of the trap, a fly entrance between the guides, a bait pan pivoted below the insect entrance and having its lower side higher than the lower ends of the supporting legs of the trap.

In testimony whereof I hereunto affix my signature.

HENRY A. FAES.